US009165663B2

(12) United States Patent
Tao

(10) Patent No.: US 9,165,663 B2
(45) Date of Patent: *Oct. 20, 2015

(54) SECURE NON-VOLATILE MEMORY DEVICE AND METHOD OF PROTECTING DATA THEREIN

(75) Inventor: Guoqiao Tao, Nijmegen (NL)

(73) Assignee: NXP B.V., Eindhoven (NL)

( * ) Notice: Subject to any disclaimer, the term of this patent is extended or adjusted under 35 U.S.C. 154(b) by 831 days.

This patent is subject to a terminal disclaimer.

(21) Appl. No.: 12/443,511

(22) PCT Filed: Sep. 27, 2007

(86) PCT No.: PCT/IB2007/053922
§ 371 (c)(1),
(2), (4) Date: Mar. 30, 2009

(87) PCT Pub. No.: WO2008/038242
PCT Pub. Date: Apr. 3, 2008

(65) Prior Publication Data
US 2010/0049906 A1 Feb. 25, 2010

(30) Foreign Application Priority Data
Sep. 29, 2006 (EP) .................... 06121561

(51) Int. Cl.
G06F 12/14 (2006.01)
G11C 16/22 (2006.01)
G06F 21/72 (2013.01)
(Continued)

(52) U.S. Cl.
CPC ............ G11C 16/22 (2013.01); G06F 12/1408 (2013.01); G06F 21/72 (2013.01); G06F 21/79 (2013.01); G11C 11/005 (2013.01)

(58) Field of Classification Search
None
See application file for complete search history.

(56) References Cited

U.S. PATENT DOCUMENTS 6,606,707 B1   8/2003   Hirota et al.
6,782,101 B1   8/2004   Huntress
(Continued)

FOREIGN PATENT DOCUMENTS

EP   1453060 A2   9/2004
FR   2760871 A1   9/1998
(Continued)

OTHER PUBLICATIONS

C. De Nardi et al, "Oxide Charge Measurements in EEPROM Devices"; Microelectronics Reliability, vol. 45, 2005; pp. 1514-1519.

Primary Examiner — Kevin Verbrugge

(57) ABSTRACT

The invention relates to a non-volatile memory device comprising: an input for providing external data to be stored on the non-volatile memory device; a first non-volatile memory block and a second non-volatile memory block, the first non-volatile memory block and the second non-volatile memory block being provided on a single die, wherein the first non-volatile memory block and second non-volatile memory block are of a different type such that the first non-volatile memory block and the second non-volatile memory block require incompatible external attack techniques in order to retrieve data there from; and—an encryption circuit for encrypting the external data forming encrypted data using unique data from at least the first non-volatile memory block as an encryption key, the encrypted data at least being stored into the second non-volatile memory block. The invention further relates to method of protecting data in a non-volatile memory device.

14 Claims, 8 Drawing Sheets

(51) Int. Cl.
 *G06F 21/79* (2013.01)
 *G11C 11/00* (2006.01)

(56) References Cited

U.S. PATENT DOCUMENTS

2003/0056070 A1 3/2003 Dayan et al.
2003/0067043 A1 4/2003 Zhang
2003/0161184 A1 8/2003 Lee et al.
2004/0012053 A1 1/2004 Zhang

FOREIGN PATENT DOCUMENTS

SECURE NON-VOLATILE MEMORY DEVICE AND METHOD OF PROTECTING DATA THEREIN

FIELD OF THE INVENTION

The invention relates to a non-volatile memory device. The invention further relates to a method of protecting data in a non-volatile memory device.

BACKGROUND OF THE INVENTION

Non-volatile memory devices (ROM, PROM, EPROM, EEPROM, etc) are widely known. Also they have been widely used in applications where the data needs to be protected, like in home applications, mobile applications, and set-top boxes (pay TV, satellite TV, etc). In the last decades various methods of attacking data on non-volatile memory devices have been developed:
 front-side de-processing combined with optical imaging
 back-side de-processing combined with voltage contrast imaging
 microprobing
 UV treatment
 Software attack
 FIB (cut and sense),
 etc.

In general non-volatile memories like floating gate-based memories and ONO-based memories have been regarded as very secure to these attacks. However, recently, in C. De Nardi et al., *Microelectronics Reliability*, Vol. 45 (2005), p 1514-1519, a method has been published which enables retrieval of data from EEPROM memory devices. This publication discloses a method to measure "on site" programmed charges in EEPROM devices. Electrical AFM based techniques (Electric Force Microscopy (EFM) and Scanning Kelvin Probe Microscopy (SKPM) are used to probe directly floating gate potentials. Both preparation and probing methods are discussed. Sample preparation to access floating gate/oxide interfaces at a few nanometers from the back-side without discharging the data reveals to be the key point, more than the probing technique itself. This method will also be referred to as back-side voltage contrast imaging.

So, a drawback of the known non-volatile memory devices is that data stored thereon may no longer be secure enough to external attacks.

SUMMARY OF THE INVENTION

It is an object of the invention to provide a non-volatile memory device, which is more secure to external attacks. It is a further object of the invention to provide a method of protecting data in a non-volatile memory device against external attacks.

The invention is defined by the independent claims. The dependent claims define advantageous embodiments.

The object of the invention is realized in that a non-volatile memory device is provided, which comprises:
 an input for providing external data to be stored on the non-volatile memory device;
 a first non-volatile memory block and a second non-volatile memory block, the first non-volatile memory block and the second non-volatile memory block being provided on a single die, wherein the first non-volatile memory block and second non-volatile memory block are of a different type such that the first non-volatile memory block and the second non-volatile memory block require incompatible external attack techniques in order to retrieve data there from; and
 an encryption circuit for encrypting the external data forming encrypted data using unique data from at least the first non-volatile memory block as an encryption key, the encrypted data at least being stored into the second non-volatile memory block.

An essential element of the invention is that the encryption in each non-volatile memory device is unique by using a unique encryption key. Another essential element of the invention is that the non-volatile memory device comprises at least two memory blocks that play a role in the encryption. As a result of these measures, in order to be able retrieve the external data, which was originally stored (in an encrypted way) on the memory device, it is essential that data is retrieved from both the first non-volatile memory block and the second non-volatile memory block of the same memory device (same die).

A non-volatile memory cell typically comprises a transistor having a charge storage region (floating gate, charge trap layer in an oxide-nitride-oxide device, etc). Each external attack technique may comprise a deprocessing (reverse engineering) step in order to be able to access the charge storage regions of the memory blocks and in order to determine how the memory cells are connected (either from the front-side or from the back-side) and an investigation/probing/observation step for determining the charge on the charge storage regions. A further essential feature of the invention is that the first non-volatile memory block and the second non-volatile memory block require different incompatible external attack techniques. This feature of the invention renders it useless to separately attack the first non-volatile memory block and the second non-volatile memory block of different dies, knowing that the data has been encrypted using unique data (so the encryption is different in each memory device).

Because of the combination of the above mentioned features of the non-volatile device according to the invention it is very hard to retrieve the data originally stored on the non-volatile memory device.

In an advantageous embodiment of the non-volatile memory device according to the invention the encryption circuit has been provided on the same die as the first non-volatile memory block and the second non-volatile memory block. This measure provides an additional level of security to the memory device, because reverse-engineering of the encryption circuit will eventually destroy the memory blocks as well.

In another advantageous embodiment of the non-volatile memory device according to the invention the first non-volatile memory block and the second non-volatile memory block are layout-wise interlaced. Interlacing of the first non-volatile memory block and the second non-volatile memory blocks makes reverse-engineering of both blocks on the same die even more difficult.

In one specific embodiment of the non-volatile memory device according to the invention the first non-volatile memory block is a poly fuse memory and the second non-volatile memory block is a floating gate memory. This combination of memory types on a single die provides a very good resistance against external-attacks, because a poly fuse memory needs to be reverse-engineered from the front-side of the device and a floating gate memory needs to be reverse-engineered from the back-side in order to access the floating gates. It is important to note that during the reverse-engineering steps material is removed from the front-side and the back-side respectively, rendering it almost impossible to reverse-engineer both memory blocks on the same die at the same time. Preferably, the poly fuse memory uses physically the same poly layer as the floating gate memory, which makes it even more difficult to reverse-engineer both memory blocks at the same time. When a hacker tries to obtain data from the first memory block, being a poly fuse memory, by means of optical imaging the retrieval of the data on the second memory block, being a floating-gate memory, is blocked. This is due to the fact that optical imaging of the poly fuse memory requires front-side de-layering of a die, while back-side voltage contrast imaging of the non-volatile memory requires back-side de-layering of a die. And it is at least extremely difficult and maybe even impossible to de-layer a die from both sides. Similarly, when a hacker tries to retrieve the data from the floating-gate memory by back-side de-layering, it would make it virtually impossible to retrieve memory information later on from the poly fuse memory from the same die.

In another embodiment of the non-volatile memory device according to the invention bit lines of at least one of the first non-volatile memory block and the second non-volatile memory block have been scrambled. Scrambling the bit lines means that the bit-lines are laid out in some sort of "spaghetti-like" way. Reverse engineering by optical inspection of the interconnections is thus made very hard by this measure.

In a further improved embodiment of the non-volatile memory device according to the invention the non-volatile memory further comprises:

a third non-volatile memory block, the third non-volatile memory block being provided on the same single die as the first non-volatile memory block and the second non-volatile memory block, wherein the third non-volatile memory block is of a different type than the first non-volatile memory block and second non-volatile memory block such that the first non-volatile memory block, the second non-volatile memory block, and the third non-volatile memory block require incompatible external attack techniques in order to retrieve data there from, the encrypted data being stored in a distributed way at least into the second non-volatile memory block and the third non-volatile memory block. Providing more memory blocks and distributing (encrypted) data over more memory blocks increases the number of reverse engineering parameters to be determined by the hacker and thus makes external attacking of the device much more difficult.

In one particular embodiment of the non-volatile memory device according to the invention the unique data from at least the first non-volatile memory block, being used as an encryption key, is changed after a predefined number of accesses to the non-volatile memory device or after a predefined time. A hacker may use huge computing power to perform numerous trial & error operations or legal operations in order to extract the encryption key from many operations. To secure the data against such reverse computing, a time-dependent encryption key, or a "maximum-number-of-usage/access" encryption key can be implemented before the encryption key is forced to expire. A time-dependent key may expire in one month, one week, one day, or even every minute (like in VPN-iRAS applications). A "maximum-number-of-usage/access" encryption key can be preset to a certain limit (e.g. 10), wherein a counter keeps track of the number of accesses and which is recorded into the memory. After that this limit has been reached, the encryption key may expire or be changed or re-issued.

Alternatively, in another embodiment of the non-volatile memory device according to the invention the unique data from at least the first non-volatile memory block comprises multiple encryption keys, each encryption key being used for part of the external data to be encrypted. This also provides an efficient way of counter-acting the reverse-computing attack of a hacker, because the computing power required increases dramatically.

In an embodiment of the non-volatile memory device according to the invention the unique data from at least the first non-volatile memory block comprises one of a Chip-ID or an IP-address. A Chip-ID and an IP-address are good examples of unique data, which are easily available in many applications.

The invention also relates to a method of protecting data in a non-volatile memory device, the method comprising steps of:

providing external data to be stored on the non-volatile memory device, the non-volatile memory device having a first non-volatile memory block and a second non-volatile memory block, the first non-volatile memory block and the second non-volatile memory block being provided on a single die, wherein the first non-volatile memory block and second non-volatile memory block are of a different type such that the first non-volatile memory block and the second non-volatile memory block require incompatible external attack techniques in order to retrieve data there from;

encrypting the external data for forming encrypted data using unique data from at least a first memory block as an encryption key; and storing the encrypted data at least on a second memory block.

The method according to the invention provides a convenient way of protecting data on a non-volatile memory device.

BRIEF DESCRIPTION OF THE DRAWINGS

Any of the additional features can be combined together and combined with any of the aspects. Other advantages will be apparent to those skilled in the art. Numerous variations and modifications can be made without departing from the scope of the claims of the present invention. Therefore, it should be clearly understood that the present description is illustrative only and is not intended to limit the scope of the present invention.

How the present invention may be put into effect will now be described by way of example with reference to the appended drawings, in which:

FIGS. 7 to 10 illustrate four different ways of interlacing memory blocks.

DETAILED DESCRIPTION

Figure 1:
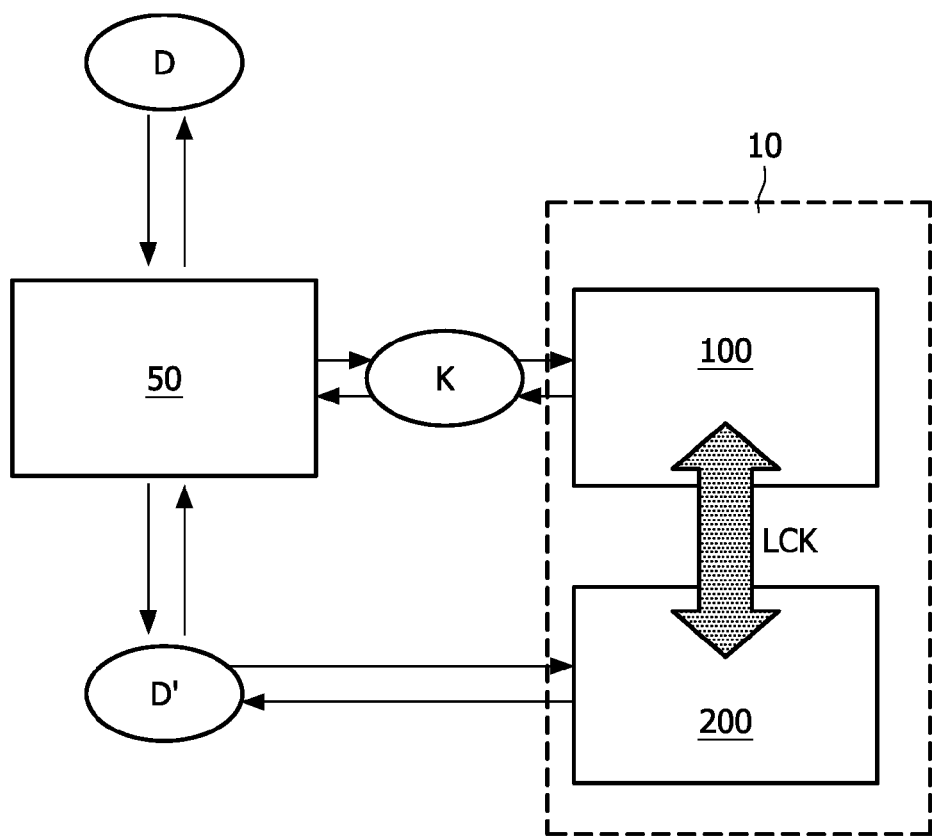
FIG. 1 illustrates a first embodiment of the non-volatile memory device according to the invention.

In FIG. 1 a non-volatile memory device according to a first embodiment of the invention is schematically illustrated. In this embodiment external data D is provided via an input (not shown) to an encryption circuit 50. The non-volatile memory device comprises a first non-volatile memory block 100 and a second non-volatile memory block 200, the first non-volatile memory block 100 and the second non-volatile memory block 200 being of a different type such that the they require incompatible external attack techniques in order to retrieve data there from.

The encryption circuit 50 encrypts the external data D using unique data K from the first non-volatile memory block 100, forming encrypted data D'. The encrypted data D' is stored in the second non-volatile memory block 200. The first non-volatile memory block 100 and the second non-volatile memory block 200 are located on the same die 10, which is an essential feature of the invention. Together with the fact that the required external attack techniques for both non-volatile memory blocks 100, 200 are incompatible, this feature provides a so-called interlock LCK between both non-volatile memory blocks 100, 200. It is therefore very difficult to retrieve data from both the first non-volatile memory block 100 and the second-non-volatile memory block 200 at the same time.

In one example of the invention, the encryption circuit 50 comprises XOR-gates, wherein each bit of the external data D is XOR-ed with a corresponding bit of the unique encryption key K from the first non-volatile memory block 100. However, the person skilled in the art may easily come up with different and more complex implementations of the encryption circuit 50.

Figure 2:
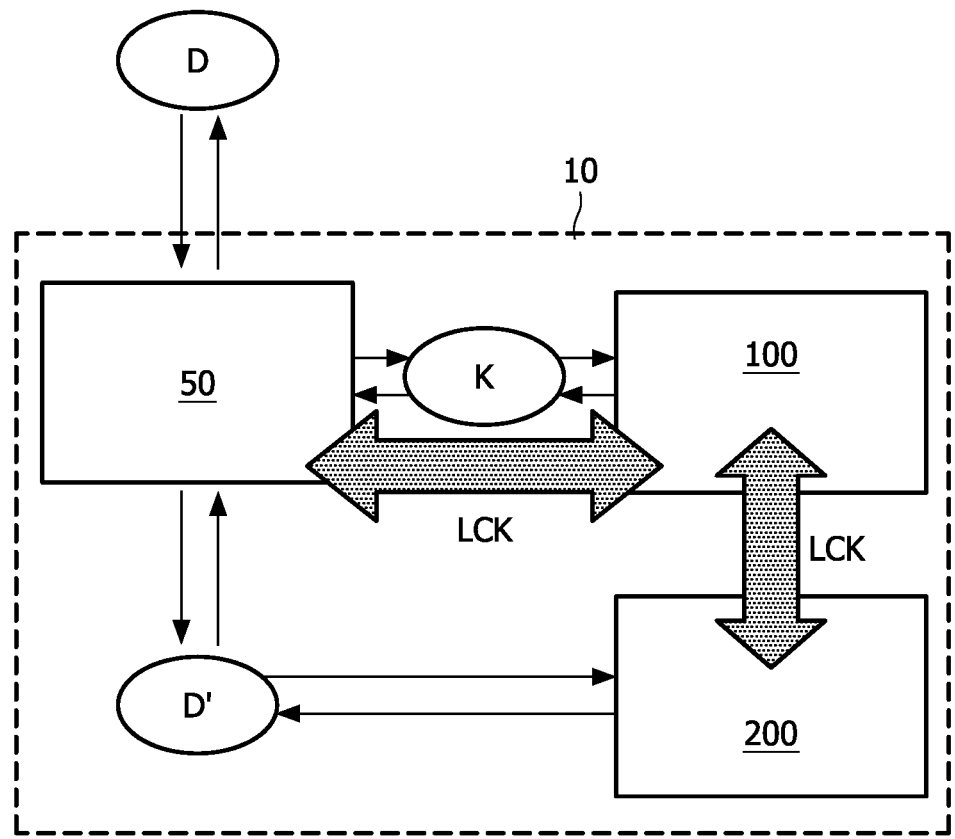
FIG. 2 illustrates a second embodiment of the non-volatile memory device according to the invention.

In FIG. 2 the non-volatile memory device according to a second embodiment of the invention is schematically illustrated. This embodiment of the non-volatile memory device according to the invention differs from the first embodiment in that the interlock LCK is also provided for the encryption circuit 50. This means that the encryption circuit 50 has been provided on the same die 10 as the first non-volatile memory block 100 and the second non-volatile memory block 200. Such a measure increases the level of security of the data D. External attack of the encryption circuit 50 may also destroy data from the first non-volatile memory block 100 and the second non-volatile memory block 200.

Figure 3:
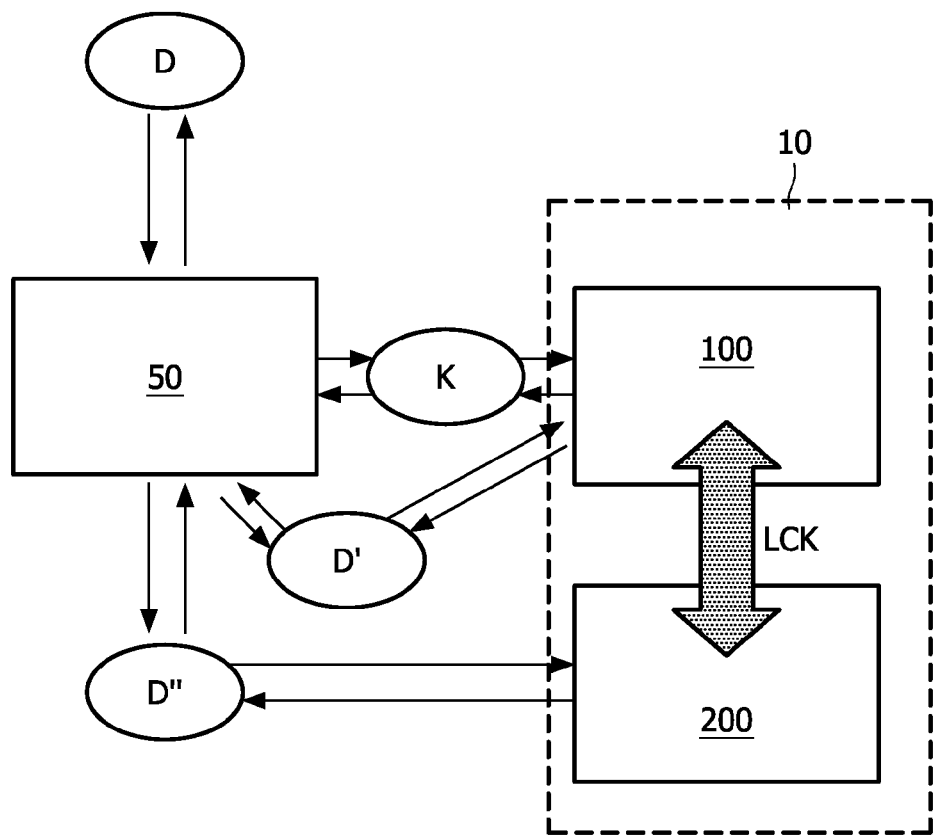
FIG. 3 illustrates a third embodiment of the non-volatile memory device according to the invention.

In FIG. 3 the non-volatile memory device according to a third embodiment of the invention is schematically illustrated. This embodiment of the non-volatile memory device according to the invention differs from the first embodiment in that a first part of the encrypted data D' is stored into the first non-volatile memory block 100 and a second part of the encrypted data D" is stored into the second non-volatile memory block 200. Spreading the encrypted data over the first and second non-volatile memory blocks 100, 200 provides a stronger interlock LCK and thus an additional security.

Figure 4:
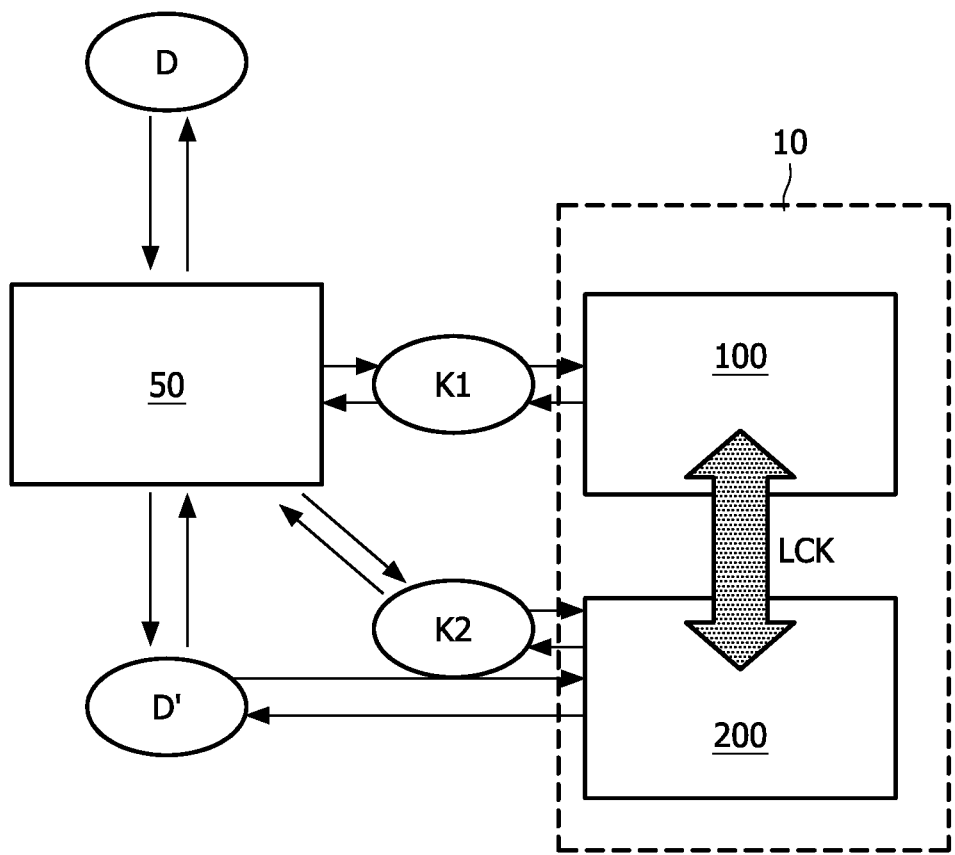
FIG. 4 illustrates a fourth embodiment of the non-volatile memory device according to the invention.

In FIG. 4 the non-volatile memory device according to a fourth embodiment of the invention is schematically illustrated. This embodiment of the non-volatile memory device according to the invention differs from the first embodiment in that the encryption key K used by the encryption circuit 50 comprises a first part K1 which has been stored in the first non-volatile memory block 100 and a second part K2 which has been stored in the second non-volatile memory block 200.

Figure 5:
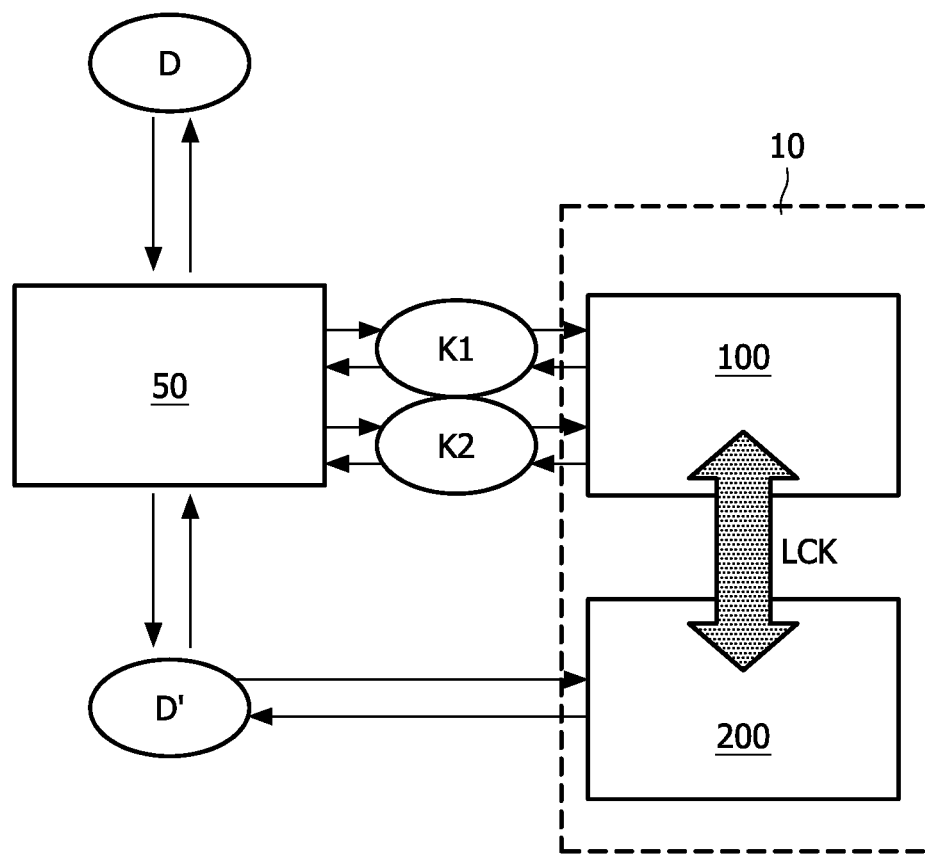
FIG. 5 illustrates a fifth embodiment of the non-volatile memory device according to the invention.

In FIG. 5 the non-volatile memory device according to a fifth embodiment of the invention is schematically illustrated. This embodiment of the non-volatile memory device according to the invention differs from the earlier mentioned embodiments in that multiple encryption keys K1, K2 are used for encrypting the external data D. The multiple encryption keys K1, K2 can be stored on the first non-volatile memory block.

Alternatively, which is more in line with the example in FIG. 4, the encryption circuit 50 uses at least two encryption keys, a first encryption key K1 being stored in the first non-volatile memory block 100 and another encryption key K2 being stored in the second non-volatile memory block 200.

In case multiple encryption keys K1, K2 are used for encrypting data, various approaches are possible. In one approach subsequent words in the external data D are encrypted using the first encryption key K1 and the second encryption key K2 in an alternating way. Alternatively, in another approach a first set of words (e.g. the first half of the external data) is encrypted using the first encryption key K1 and a second set of words (e.g. the second half of the external data) is encrypted using the second encryption key K2. In yet another approach each external data word to be stored is encrypted using a different encryption key, all encryption keys being stored on the first non-volatile memory block 100.

Figure 6:
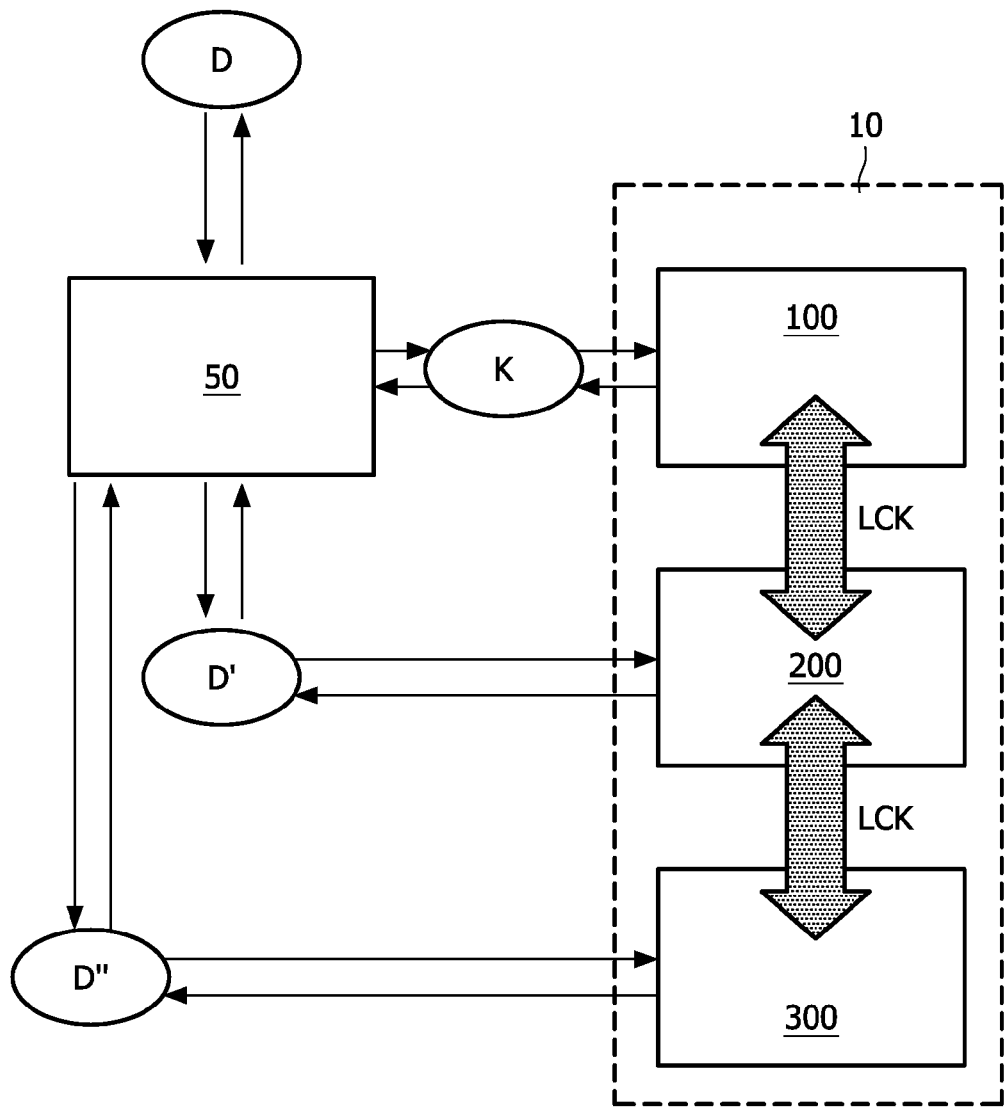
FIG. 6 illustrates a sixth embodiment of the non-volatile memory device according to the invention.

In FIG. 6 the non-volatile memory device according to a sixth embodiment of the invention is schematically illustrated. This embodiment of the non-volatile memory device according to the invention differs from the third embodiment in that the non-volatile memory device further comprises a third non-volatile memory block 300. The encrypted data D now comprises a first part D' which is being stored on the second non-volatile memory block 200 and a second part D" which is being stored on the third non-volatile memory block 300. Spreading the encrypted data over multiple non-volatile memory blocks 200, 300 provides a stronger interlock LCK and thus an additional security.

The embodiments mentioned above can be combined as well. For example, the second embodiment dealing with the encryption circuit 50 being provided on the same die as the memory blocks, can be easily combined with any one of the other embodiments.

In the above embodiments a word may comprise 16, 32, 64, 128 bits in some examples. However, in principle, in all embodiments, a word can be of any length.

It is important to note that the encryption circuit 50 in all described embodiments of the non-volatile memory may also be designed to decrypt the encrypted (stored) data D' when reading from the non-volatile memory device. Alternatively, a separate decryption circuit (not shown) may be provided. For this decryption circuit the same interlock aspects hold as for the encryption circuit 50.

It is also important to note that the external data may be encrypted data as well. This measure counteracts attack techniques like IC pin probing when the non-volatile memory device is placed in its application. In such a case the stored encrypted data D' has been encrypted twice.

In a concrete example of the first embodiment of the non-volatile memory device according to the invention, the product concerns a single chip secure "product X" manufactured in a 90 nm technology. The technology features salicided polyfuses to be used as non-volatile memory. In "product X" this memory type is used for the first non-volatile memory block 100. The technology also features floating-gate memory as non-volatile memory. In "product X" this memory type is used for the second non-volatile memory block. The physical layer of the floating gates in the second non-volatile memory block 200 have been manufactured in the same physical layer as the salicided polyfuses in the first non-volatile memory block 100. This ensures a firm interlock LCK between the first and second non-volatile memories. When attacking the content of memory the polyfuse memory block 100, the content of the other floating memory block 200 is destroyed, and vice versa. In "product X", the first non-volatile memory block 100 contains a DieID code, which then forms a hardware private key. "Product X" could further comprise a provider ID, which may be from companies like UPC or KPN. The provider ID can be stored on the first memory block 100 as well, and then forms together with the DieID code the hardware private key. The second non-volatile memory block 200 contains the encrypted (using the hardware private key) customer ID (being the original external data). The second non-volatile memory block 200 may also comprise an encrypted (using the hardware private key) public key. Sometimes this public key is temporary.

Figure 8:
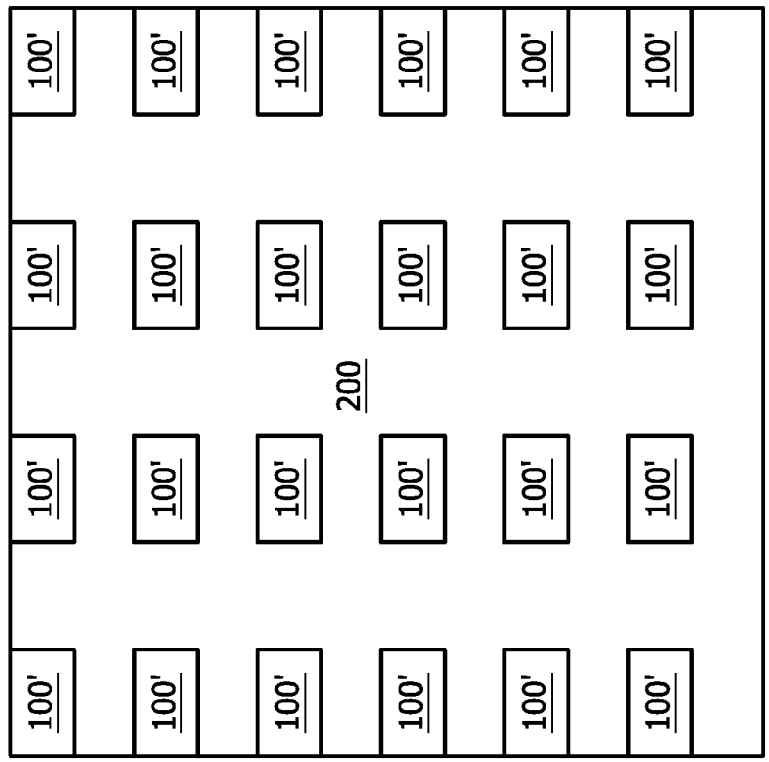
Figure 7:
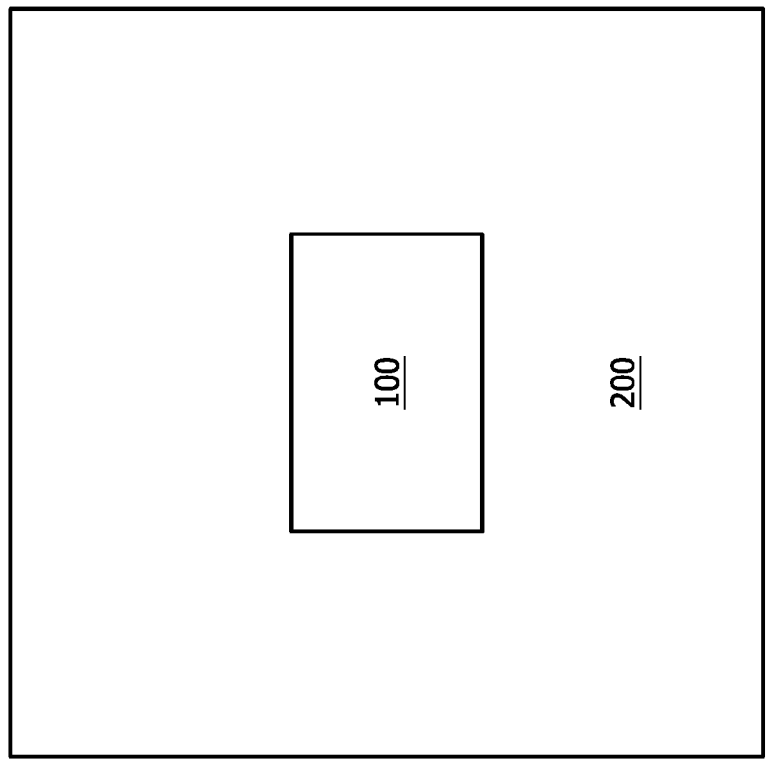
Figures 9, 10:
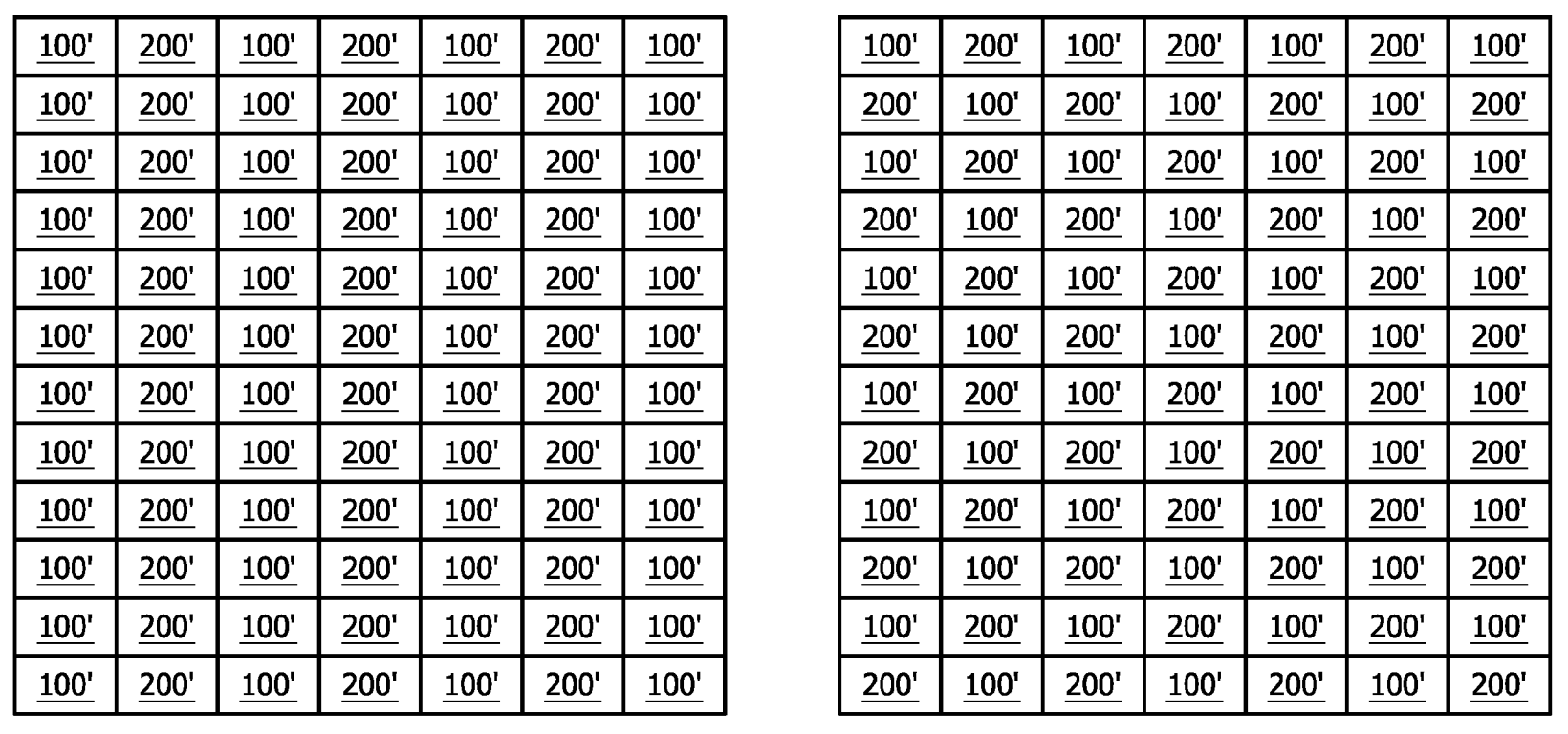

Another way of further improving the protection of the data on the non-volatile memory device is to interlace the memory blocks layout-wise. FIGS. 7 to 10 illustrate different approaches of interlacing two memory blocks. FIG. 7 illustrates a first non-volatile memory block 100 and a second non-volatile memory block 200, wherein the first non-volatile memory block 100 has been laid out inside the second non-volatile memory block 200. FIG. 8 illustrates another approach wherein memory cells 100' of the first non-volatile memory block 100 have been scattered or distributed over the layout of the second non-volatile memory block 200. FIG. 9 illustrates a third approach wherein memory cells 100' of the first non-volatile memory block 100 and memory cells 200' of the second non-volatile memory block 200 have been arranged in columns in an alternating way. Such an approach is interesting when the memory blocks 100, 200 are of comparable size. FIG. 10 illustrates a fourth approach wherein memory cells 100' of the first non-volatile memory block 100 and memory cells 200' of the second non-volatile memory block 200 have been arranged in an alternating way in both the column as well as the row direction. This approach is expected to provide the best interlock. However, for such an approach is most effective in case memory cells 100', 200' of the first 100 and second non-volatile memory blocks 200 are of comparable size.

An alternative way of further improving the protection of the data on the non-volatile memory device is to implement bit-line scrambling. Bitline scambling is a kind of local "encryption" such that a logical bit and a physical bit are scrambled. One example is to make use of the multi-layered wiring in the technology through a "spaghetti-like" way so that the bit-line address for every byte (or word) columns are totally different from other bytes/words. In this way, the logic bits are scrambled physically and become very difficult to trace. For example, a 3 bits shifted byte would become Bit 3, Bit 4, Bit 5, Bit 6, Bit 7, Bit 0, Bit 1, Bit 2 (instead of Bit 0, . . . 7), and a mirrored byte would have bit sequence of Bit 7, Bit 6, Bit 5, Bit 4, Bit 3, Bit 2, Bit 1, Bit 0. In a real implementation, the scrambling is a combination of shifting, mirroring, swapping, etc. Bit-line scrambling makes reverse engineering by means of optical inspection very difficult. Bit-line scrambling can be combined with memory interlacing.

The invention thus provides a non-volatile memory device, which is more secure against external attack techniques. An important aspect of the invention lies in the interlocking of two or more memory blocks combined with the encryption of data being stored thereon. The person skilled in the art knows the non-volatile memory technology used in the embodiments. The person skilled in the art also knows about non-volatile memory operation and integration. It is the insight of the inventors that a clever combination and integration of more than one memory on a single die combined with the encryption of the data thereon, wherein the encryption key is stored at least on one of the memories, provides a good interlock of the data and therefore a good security against external attacks. The invention may be used in various applications like: identification applications, home applications, mobile applications, and set-top boxes (pay TV, satellite TV, etc).

The invention also provides a method of protecting data in a non-volatile memory device, the method comprising steps of:

providing external data to be stored on the non-volatile memory device, the non-volatile memory device having a first non-volatile memory block and a second non-volatile memory block, the first non-volatile memory block and the second non-volatile memory block being provided on a single die, wherein the first non-volatile memory block and second non-volatile memory block are of a different type such that the first non-volatile memory block and the second non-volatile memory block require incompatible external attack techniques in order to retrieve data there from;

encrypting the external data for forming encrypted data using unique data from at least a first memory block as an encryption key; and storing the encrypted data at least on a second memory block.

The advantages and improvements of this method follow those of the memory device described above.

The present invention has been described with respect to particular embodiments and with reference to certain drawings but the invention is not limited thereto but only by the claims. Any reference signs in the claims shall not be construed as limiting the scope. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Whenever the words "column" and "row" are used, they can be exchanged as well without departing from the scope of the invention.

The invention claimed is:

1. A non-volatile memory device comprising:
   an input port for providing external data to be stored on the non-volatile memory device;
   a first non-volatile memory circuit and a second non-volatile memory circuit, the first non-volatile memory circuit and the second non-volatile memory circuit being provided on a single die and are layout-wise interlaced, wherein the first non-volatile memory circuit and second non-volatile memory circuit are of a different type such that the first non-volatile memory circuit and the second non-volatile memory circuit require incompatible external attack techniques in order to retrieve data there from; and
   an encryption circuit for encrypting the external data forming encrypted data using unique data from at least the first non-volatile memory circuit as an encryption key, the encrypted data at least being stored into the second non-volatile memory circuit.

2. A non-volatile memory device comprising:
   an input port for providing external data to be stored on the non-volatile memory device;

a first non-volatile memory circuit and a second non-volatile memory circuit, the first non-volatile memory circuit and the second non-volatile memory circuit being provided on a single die, wherein the first non-volatile memory circuit is a poly fuse memory and the second non-volatile memory circuit is a floating gate memory, and the first and second non-volatile memory circuits require incompatible external attack techniques in order to retrieve data there from; and an encryption circuit for encrypting the external data forming encrypted data using unique data from at least the first non-volatile memory circuit as an encryption key, the encrypted data at least being stored into the second non-volatile memory circuit.

3. A non-volatile memory device as claimed in claim 2, wherein the poly fuse memory uses physically the same poly layer as the floating gate memory.

4. A non-volatile memory device comprising:
an input port for providing external data to be stored on the non-volatile memory device;
a first non-volatile memory circuit and a second non-volatile memory circuit, the first non-volatile memory circuit and the second non-volatile memory circuit being provided on a single die, wherein bit lines of at least one of the first non-volatile memory circuit and the second non-volatile memory circuit have been scrambled and the first non-volatile memory circuit and second non-volatile memory circuit are of a different type such that the first non-volatile memory circuit and the second non-volatile memory circuit require incompatible external attack techniques in order to retrieve data there from; and
an encryption circuit for encrypting the external data forming encrypted data using unique data from at least the first non-volatile memory circuit as an encryption key, the encrypted data at least being stored into the second non-volatile memory circuit.

5. A non-volatile memory device comprising:
an input port for providing external data to be stored on the non-volatile memory device;
a first non-volatile memory circuit and a second non-volatile memory circuit, the first non-volatile memory circuit and the second non-volatile memory circuit being provided on a single die, wherein the first non-volatile memory circuit and second non-volatile memory circuit are of a different type such that the first non-volatile memory circuit and the second non-volatile memory circuit require incompatible external attack techniques in order to retrieve data there from;
a third non-volatile memory circuit, the third non-volatile memory circuit being provided on the same single die as the first non-volatile memory circuit and the second non-volatile memory circuit, wherein the third non-volatile memory circuit is of a different type than the first non-volatile memory circuit and second non-volatile memory circuit such that the first non-volatile memory circuit, the second non-volatile memory circuit, and the third non-volatile memory circuit require incompatible external attack techniques in order to retrieve data there from; and
an encryption circuit for encrypting the external data forming encrypted data using unique data from at least the first non-volatile memory circuit as an encryption key, the encrypted data at least being stored in a distributed way into the second non-volatile memory circuit and third non-volatile memory circuit.

6. An apparatus comprising:
an input circuit configured and arranged to receive external data;
a first non-volatile memory circuit and a second non-volatile memory circuit, at least one of the first non-volatile memory circuit and the second non-volatile memory circuit having scrambled bit lines via which data in the first non-volatile memory circuit must be accessed differently than data in the second non-volatile memory circuit is accessed; and
an encryption circuit configured and arranged with the first non-volatile memory circuit and with the second non-volatile memory circuit to encrypt the external data using data from at least the first non-volatile memory circuit as an encryption key, and to store the encrypted data in the second non-volatile memory circuit.

7. The apparatus of claim 6, wherein at least one of the first non-volatile memory circuit and the second non-volatile memory circuit is configured and arranged with scrambled bit lines that require different external attack techniques for retrieving data respectively from the first non-volatile memory circuit and the second non-volatile memory circuit.

8. The apparatus of claim 6, wherein the first non-volatile memory circuit is configured and arranged to change the data being used as an encryption key, after an event selected from the group consisting of: a predefined number of accesses to the non-volatile memory device, and a predefined time having elapsed.

9. The apparatus of claim 6, wherein the data from the first non-volatile memory circuit includes multiple encryption keys, and the encryption circuit is configured and arranged to use each encryption key to encrypt part of the external data.

10. The apparatus of claim 9, wherein the first non-volatile memory circuit and the second non-volatile memory circuit are on a single die.

11. The apparatus of claim 6, wherein the data from the first non-volatile memory circuit includes data selected from the group consisting of: a Chip-ID and an IP-address.

12. The apparatus claim 6, further including providing the external data, wherein the first non-volatile memory circuit and the second non-volatile memory circuit are provided on a single die and are of a different type and are configured and arranged with differently-coded attributes, thereby requiring incompatible external attack techniques in order to retrieve data therefrom.

13. A method comprising:
in a non-volatile memory circuit, scrambling bit lines in at least one of a first non-volatile memory and a second non-volatile memory, therein rendering external data access requirements for the first non-volatile memory different than external data access requirements in the second non-volatile memory;
encrypting external data received on an input port using data from at least the first non-volatile memory as an encryption key; and
storing the encrypted data in the second non-volatile memory.

14. The method of claim 13, wherein scrambling the bit lines includes inhibiting external attack techniques for retrieving data from the non-volatile memory circuit, by requiring different attack techniques for each of the first non-volatile memory and the second non-volatile memory.

* * * * *